(12) United States Patent
Choi et al.

(10) Patent No.: US 12,225,175 B2
(45) Date of Patent: Feb. 11, 2025

(54) METHOD AND APPARATUS FOR CREATING VIRTUAL WORLD

(71) Applicant: INDUSTRY ACADEMY COOPERATION FOUNDATION OF SEJONG UNIVERSITY, Seoul (KR)

(72) Inventors: Soo Mi Choi, Seoul (KR); Jong Won Lee, Seoul (KR); Ho San Kang, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 190 days.

(21) Appl. No.: 18/050,448

(22) Filed: Oct. 27, 2022

(65) Prior Publication Data

US 2024/0080427 A1 Mar. 7, 2024

(30) Foreign Application Priority Data

Sep. 5, 2022 (KR) .......................... 10-2022-0111872

(51) Int. Cl.
| | |
|---|---|
| *G06T 17/00* | (2006.01) |
| *G06T 7/13* | (2017.01) |
| *G06T 7/593* | (2017.01) |
| *G06V 10/764* | (2022.01) |
| *G06V 20/20* | (2022.01) |
| *H04N 13/111* | (2018.01) |
| *H04N 13/366* | (2018.01) |

(52) U.S. Cl.
CPC .............. *H04N 13/111* (2018.05); *G06T 7/13* (2017.01); *G06T 7/593* (2017.01); *G06V 10/764* (2022.01); *G06V 20/20* (2022.01); *H04N 13/366* (2018.05)

(58) Field of Classification Search
CPC .............................. G06F 3/011; G06T 19/006
See application file for complete search history.

(56) References Cited

U.S. PATENT DOCUMENTS

| | | | |
|---|---|---|---|
| 9,401,044 B1 * | 7/2016 | Kaufman | G06F 3/017 |
| 10,725,308 B1 * | 7/2020 | Trail | G06F 3/012 |
| 11,024,079 B1 * | 6/2021 | Chuah | G06T 7/246 |
| 11,361,513 B2 | 6/2022 | Lohr et al. | |

(Continued)

FOREIGN PATENT DOCUMENTS

| | | |
|---|---|---|
| KR | 10-2017-0081964 A | 7/2017 |
| KR | 10-2020-0027846 A | 3/2020 |
| KR | 10-2021-0154814 A | 12/2021 |

*Primary Examiner* — Phong X Nguyen (57) ABSTRACT

An apparatus for creating a virtual world includes a processor and a memory connected to the processor, in which the memory stores program instructions executed by the processor so as to receive an image of a real space through a device having a stereo camera, collect mesh data for the real space and an object existing in the real space through the image, determine coordinates for first edges of the real space from the mesh data for the real space, select one of a plurality of second edges based on an area of a virtual space defined by each of the plurality of second edges facing a predetermined direction, when there are more first edges of the real space than edges of a polygon preset for the real space, and output a virtual space defined by some of the first edges and the selected one second edge and a virtual object corresponding to the real object recognized in the real space.

5 Claims, 10 Drawing Sheets

(56) References Cited

U.S. PATENT DOCUMENTS

| | | | |
|---|---|---|---|
| 11,676,351 B1* | 6/2023 | Yang | G06T 17/20 |
| | | | 345/419 |
| 2018/0075648 A1* | 3/2018 | Moghadam | G01S 17/86 |
| 2018/0103284 A1* | 4/2018 | Kubo | G06F 21/316 |
| 2018/0190022 A1* | 7/2018 | Zamir | G06T 19/006 |
| 2020/0342673 A1* | 10/2020 | Lohr | G06F 3/013 |
| 2021/0248826 A1* | 8/2021 | Shriram | G06V 10/764 |
| 2021/0335034 A1* | 10/2021 | Bell | G06T 17/00 |
| 2022/0406026 A1* | 12/2022 | Marotta | G06Q 30/0633 |
| 2023/0377300 A1* | 11/2023 | Becker | H04N 23/61 |
| 2023/0401805 A1* | 12/2023 | Lee | G06F 3/04815 |
| 2024/0080427 A1* | 3/2024 | Choi | G06F 3/011 |

* cited by examiner

```
Virtual space creation algorithm using VIVE PRO HMD mesh: List of mesh data measured by scanning real space
edge: List of 2D coordinates of the vertices of each quadrant calculated from the mesh data
low, high: User setting values of the floor and height of the created virtual space
vtx: List of 3D coordinates corresponding to each vertex in virtual space procedure CreateVirtualSpace
    initialize mesh, edge, low, high, vtx
    low ← insertFloorValue
    high ← insertCeilingValue
    for scanningRoom do
        setMeshData(mesh)
    end for for each edge do
        for each mesh do
            for i ← 0 to 2 do
                p1 ← insertVector3(mesh.vector3[i])
                if getOriginPoint(edge.|x|) < p1.|x|
                && getOriginPoint(edge.|z|) < p1.|z|
                    then edge ← insert(p1.x, p1.z)
                    continue
                else
                    v1 ← |insertVectorValue(mesh.vector3[i].x, mesh.vector3[i].z)|
                    v2 ← |insertVectorValue(p1.x, p1.z)|
                    if v1 < v2
                        then edge ← insert(p1.x, p1.z)
                    end if
                end if
            end for
        end for
    end for for i ← 0 to each vtx do
        if i/2 == 0 then
            vtx ← insertVector3(edge[i/2].x, low, edge[i/2].z)
        else if i/2 == 1 then
            vtx ← insertVector3(edge[i/2].x, high, edge[i/2].z)
        end if
    end for
end CreateVirtualSpace
```

METHOD AND APPARATUS FOR CREATING VIRTUAL WORLD

CROSS-REFERENCE TO RELATED APPLICATION

This present application claims priority under 35 U.S.C. § 119(a) to Korean Patent Application No. 10-2022-0111872 filed in the Korean Intellectual Property Office on Sep. 5, 2021, the entire contents of which are incorporated herein by reference.

BACKGROUND

(a) Technical Field

The present disclosure relates to method and apparatus for creating a virtual world, and more particularly, to method and apparatus for easily creating a virtual world by inputting an image of a real world.

(b) Background Art

Recently, as interest in virtual/augmented/mixed reality has increased with the development of metaverse, contents have been actively studied in numerous fields, such as remote video conferencing, interview, freshman orientation, and entertainment.

For commercial use with this trend, there are attempts to introduce metaverse in various fields, but the entry barrier for software development is high, and the shortage of experts is overlapping, making it difficult to be introduced.

'Gather Town', one of metaverse platforms, is software that conducts video conferencing online using a virtual space and user characters with 2D graphics. Such a 2D virtual space is a form of fusing video conferencing and metaverse, and although the entry barrier for content development is not high, its presence is very low compared to an actual meeting.

On the other hand, most of 3D metaverse platforms use contents while feeling directly a space and an object and interacting between the space and the object by wearing a head-mounted display (HMD). In order to develop these 3D contents, a 3D development tool need to be used, and representative examples are Unity software and Unreal Engine software. Unity is a game engine that provides a 3D virtual reality and a development environment for architectural visualization and 2D video games. Unreal Engine is similar to Unity, but supported platforms are different and programming languages required for development are different.

Currently, authoring based on virtual/augmented and mixed reality is mostly performed in the form of pre-programming on a desktop, and most of software for development adopts the aforementioned Unity and Unreal Engine. To use the software, there is a need for experts who can handle the software.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure is derived to solve the problems in the related art, and an object of the present disclosure is to provide method and apparatus for creating a virtual world capable of easily creating the virtual world without dealing with complex authoring software.

The objects of the present disclosure are not limited to the aforementioned objects, and other objects, which are not mentioned above, will be apparent to those skilled in the art from the following description.

According to an aspect of the present disclosure, there is provided an apparatus for creating a virtual world including a processor and a memory connected to the processor, in which the memory stores program instructions executed by the processor so as to receive an image of a real space through a device having a stereo camera, collect mesh data for the real space and an object existing in the real space through the image, determine coordinates for first edges of the real space from the mesh data for the real space, select one of a plurality of second edges based on an area of a virtual space defined by each of the plurality of second edges facing a predetermined direction, when there are more first edges of the real space than edges of a polygon preset for the real space, and output a virtual space defined by some of the first edges and the selected one second edge and a virtual object corresponding to the real object recognized in the real space.

The apparatus may be a head-mounted display, and the program instructions may determine coordinates for the first edges by tracking a position of the head mounted display in the real space through at least two tracking devices disposed in the real space.

In the program instructions, 3D initial coordinates of the head mounted display may be set as an origin point at the center in the real space, and a y-coordinate in the 3D initial coordinates may be preset by a user.

A boundary of the real space may be defined by x and z coordinates of at least some of the first edges of the real space based on the 3D initial coordinates.

Each edge of the preset polygon may be disposed in one of quadrants divided into x-axis and y-axis, and the x-axis and z-axis, and the program instructions may calculate an area of a virtual space defined by each of the plurality of second edges positioned within a predetermined angular range on the same axis or the same quadrant, and select one second edge having the largest calculated area.

The program instructions may classify the real object recognized in the real space in detail through a deep learning model, and output a virtual object corresponding to the classified real object in detail.

The program instructions may output an image corresponding to a virtual simulation preset in the virtual space.

According to another aspect of the present disclosure, there is provided a method for creating a virtual world in a computing device including a processor and a memory including, receiving an image of a real space through a device having a stereo camera, collecting mesh data for the real space and an object existing in the real space through the image, determining coordinates for first edges of the real space from the mesh data for the real space, selecting one of a plurality of second edges based on an area of a virtual space defined by each of the plurality of second edges facing a predetermined direction, when there are more first edges of the real space than edges of a polygon preset for the real space, and outputting a virtual space defined by some of the first edges and the selected one second edge and a virtual object corresponding to the real object recognized in the real space.

According to yet another aspect of the present disclosure, there is provided a program stored in a computer-readable recording medium for performing the method.

According to the present disclosure, there is an advantage that even non-experts can easily create virtual spaces and virtual objects intelligently.

The effects of the present disclosure are not limited to the aforementioned effect, and other effects not mentioned above will be clearly understood to those skilled in the art from the description of the appended claims.

BRIEF DESCRIPTION OF THE DRAWINGS

FIGS. 5 to 6B are diagrams illustrating a process of selecting edges for defining a virtual space when a real space is set to a quadrangle having four edges.

DETAILED DESCRIPTION

The present disclosure may have various modifications and various embodiments and specific embodiments will be illustrated in the drawings and described in detail in the detailed description. However, this does not limit the present disclosure to specific embodiments, and it should be understood that the present disclosure covers all the modifications, equivalents and replacements included within the idea and technical scope of the present disclosure.

The terms used in the present specification are used only to describe specific embodiments, and are not intended to limit the present disclosure. The singular expression includes the plural expression unless the context clearly dictates otherwise. In this specification, it should be understood that the term "including" or "having" indicates that a feature, a number, a step, an operation, a component, a part or the combination thereof described in the specification is present, but does not exclude a possibility of presence or addition of one or more other features, numbers, steps, operations, components, parts or combinations, in advance.

In addition, components of the embodiments described with reference to each drawing are not limitedly applied only to the corresponding embodiments, but may be implemented to be included in other embodiments within the scope in which the technical spirit of the present disclosure is maintained. In addition, even if a separate description is omitted, it is natural that a plurality of embodiments may be implemented again as one integrated embodiment.

In addition, in the description with reference to the accompanying drawings, like components designate like reference numerals regardless of reference numerals and a duplicated description thereof will be omitted. In describing the present disclosure, a detailed description of related known technologies will be omitted if it is determined that they unnecessarily make the gist of the present disclosure unclear.

Figure 1:
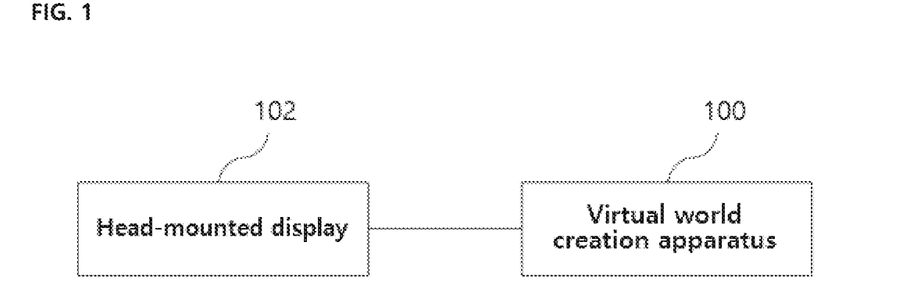
FIG. 1 is a diagram illustrating a system for creating a virtual world according to a preferred embodiment of the present disclosure.

FIG. 1 is a diagram illustrating a system for creating a virtual world according to a preferred embodiment of the present disclosure.

A system for creating a virtual world according to the embodiment is a diagram illustrating a virtual world creation apparatus 100 and a head-mounted display 102.

The virtual world creation apparatus 100 according to the embodiment may include a processor and a memory.

The processor may include a central processing unit (CPU) capable of executing a computer program, other virtual machines, or the like.

The memory may include a nonvolatile storage device such as a fixed hard drive or a detachable storage device. The detachable storage device may include a compact flash unit, a USB memory stick, etc. The memory may also include volatile memories such as various types of random access memories.

Program instructions according to the embodiment create a virtual space corresponding to a real space and an augmented image (virtual object) for a real object disposed in the real space by inputting image information about the real space (real world).

Figure 2:
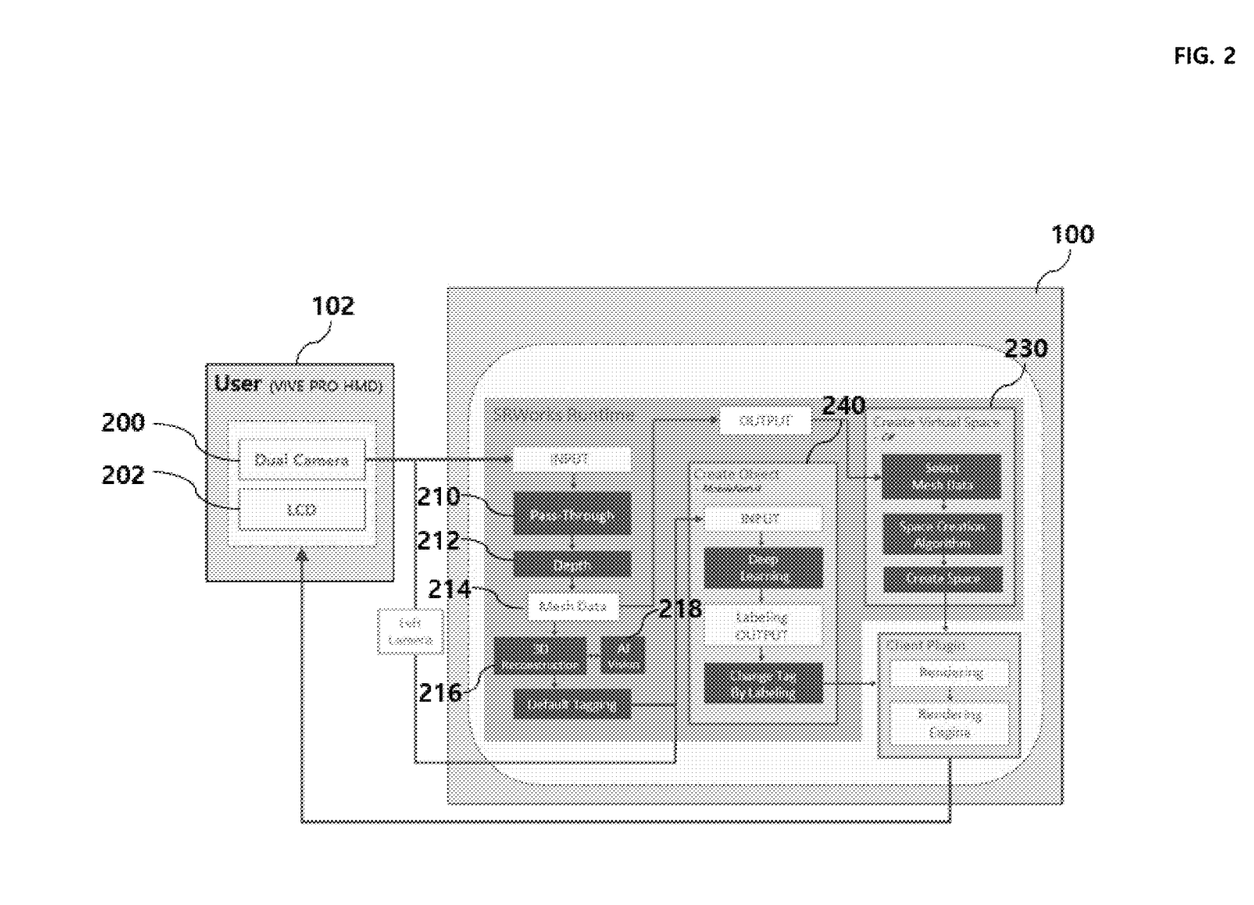
FIG. 2 is a diagram illustrating a detailed configuration of a head-mounted display and an apparatus for creating a virtual world according to the embodiment.

FIG. 2 is a diagram illustrating a detailed configuration of a head-mounted display and an apparatus for creating a virtual world according to the embodiment.

As illustrated in FIG. 2, the head-mounted display 102 according to the embodiment includes a stereo camera 200 and captures an image of the real space through the camera.

The captured image is output through the LCD 200.

As illustrated in FIG. 2, the virtual world creation apparatus 100 according to the embodiment includes a pass-through module 210, a depth module 212, a mesh data collection module 214, a 3D reconstruction module 216, and an AI vision module 218.

When the pass-through module 210 is activated using the stereo camera data, the pass-through module 210 may view the real world while the head-mounted display 102 is worn, and additionally see material or texture effects.

The depth module 212 estimates the depths of the real space and the real object disposed in the real space.

In the embodiment, the depths are estimated using the mismatch of viewpoints between the stereo cameras 200 spaced apart from each other.

The mesh data collection module 214 collects mesh data of the real space and the real object disposed in the real space by using depth information.

The collected mesh data is input to a virtual space creation module 230.

The virtual space creation module 230 selects mesh data and creates a virtual space through a predetermined algorithm.

Figure 3A:
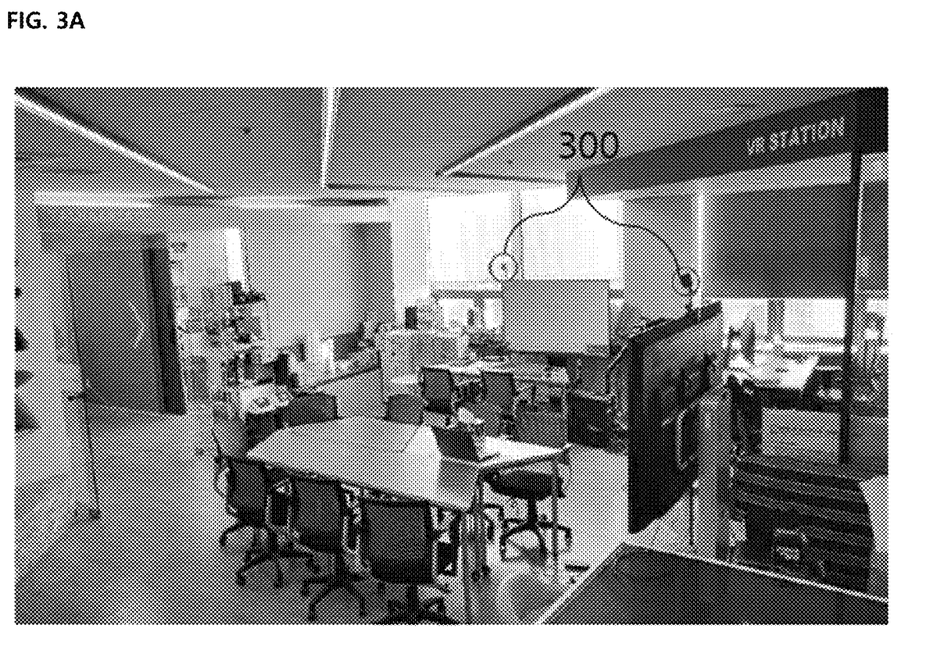
FIGS. 3A and 3B are diagrams illustrating a real world and a virtual world implemented through the real world according to the embodiment.
Figure 3B:
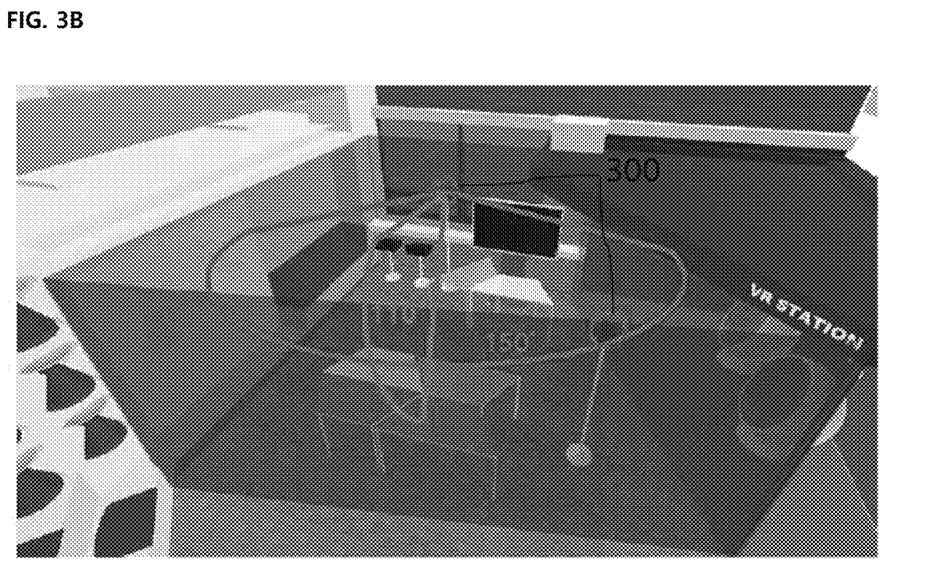

FIGS. 3A and 3B are diagrams illustrating a real world and a virtual world implemented through the real world according to the embodiment.

As illustrated in FIGS. 3A and 3B, a device 300 capable of tracking the position of the head-mounted display 102 is disposed in the real space to determine the position of the head-mounted display 102 in the real space.

The head-mounted display 102 according to the embodiment may be a VIVE PRO for professional VR, and the position tracking device may be a base station interworking with VIVE PRO, but is not necessarily limited thereto.

At least two position tracking devices 300 according to the embodiment may be installed in the real space, and may have a recognition range of a predetermined angle (e.g., vertical 110°/horizontal 150°) in vertical and horizontal directions, and may be installed within a predetermined distance from each other.

The virtual space creation module 230 creates a virtual space through the collected mesh data and the current position of the head-mounted display 102 through the position tracking device 300.

Figure 4A:
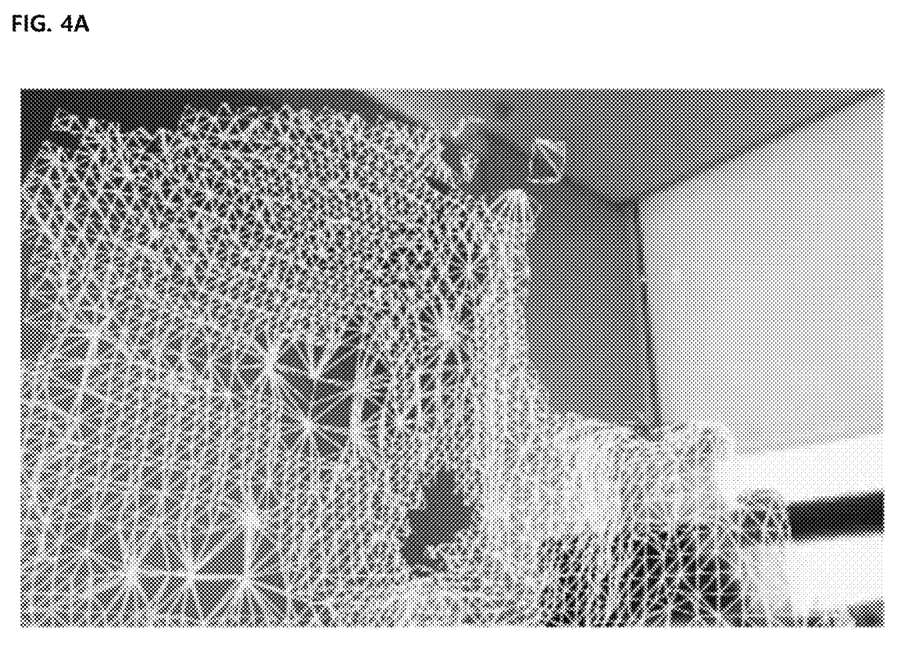
FIGS. 4A and 4B are diagrams illustrating a mesh data collection process for a real space and a real object according to the embodiment.
Figure 4B:
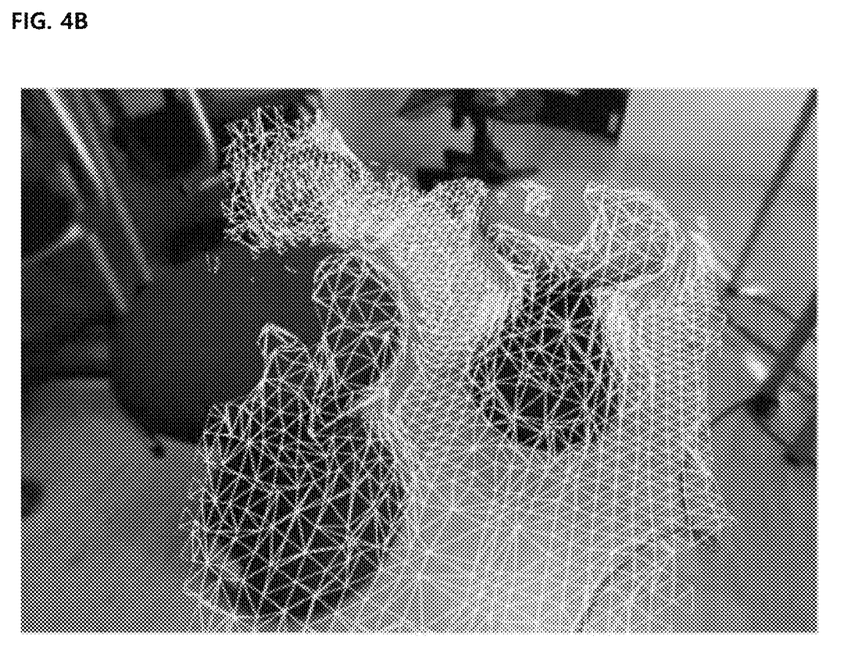

FIGS. 4A and 4B are diagrams illustrating a mesh data collection process for a real space and a real object according to the embodiment.

As illustrated in FIGS. 4A to 4B, the wall and the floor of the real space are constructed in the form of mesh data.

Here, the mesh data refers to an unstructured grid having a sequence of data arranged at regular intervals and other elements, and the figures constituting the mesh data may include variously triangles, rectangles, hexagons, and the like.

According to the embodiment, according to a shape of a virtualized place, a user starts from the center of the real space and collects mesh data while viewing the edges (parts capable of determining a boundary of the real space) of the real space.

Initially, the head-mounted display 102 is positioned at a middle position (center) of the real space, and at this time, 3D coordinates of the head-mounted display 102 are set to x, y, z=(0, y, 0).

Here, y may be preset as a height from the ground at a standing position of the user, and is set not to be changed even if the head-mounted display 102 moves.

According to the embodiment, the real space is preset to be a polygon (square, pentagon, hexagon, etc.) having a predetermined number of edges, and a virtual space is created.

The virtual world creation module 230 determines coordinates of the edges of the real space from the mesh data for the real space collected as described above.

As described above, the head-mounted display 102 is initially positioned in the center of the real space to capture images around the real space, and may determine coordinates of edges (first edges) capable of defining the boundary of the real space when the mesh data for the real space is collected.

Figure 5:
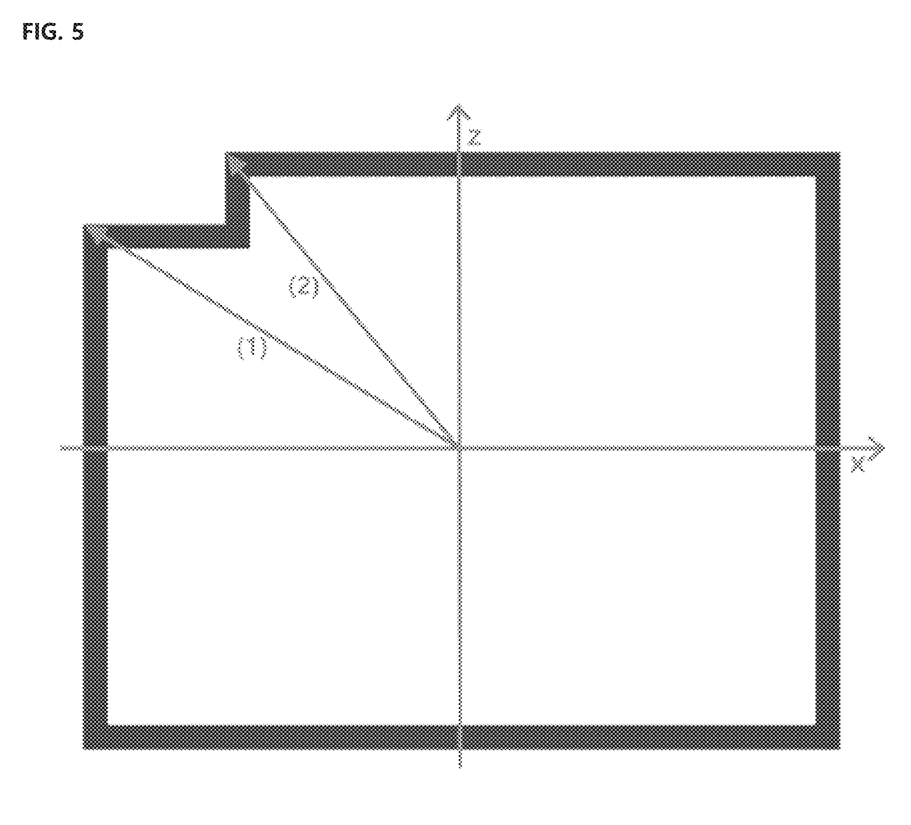

When the real space matches a polygon set by the user, there is no problem, but when the real space has an irregular shape as illustrated in FIG. 5, edges for defining the virtual space need to be selected.

Figure 6A:
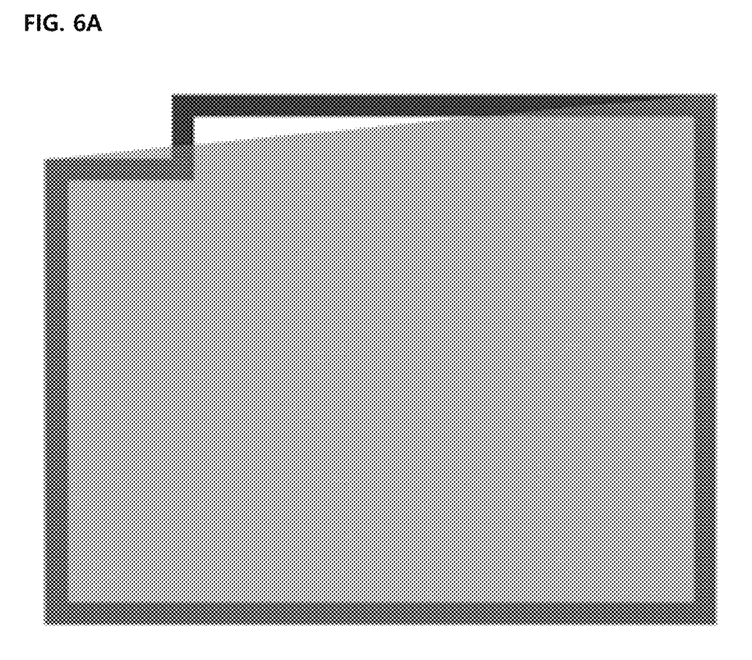
Figure 6B:
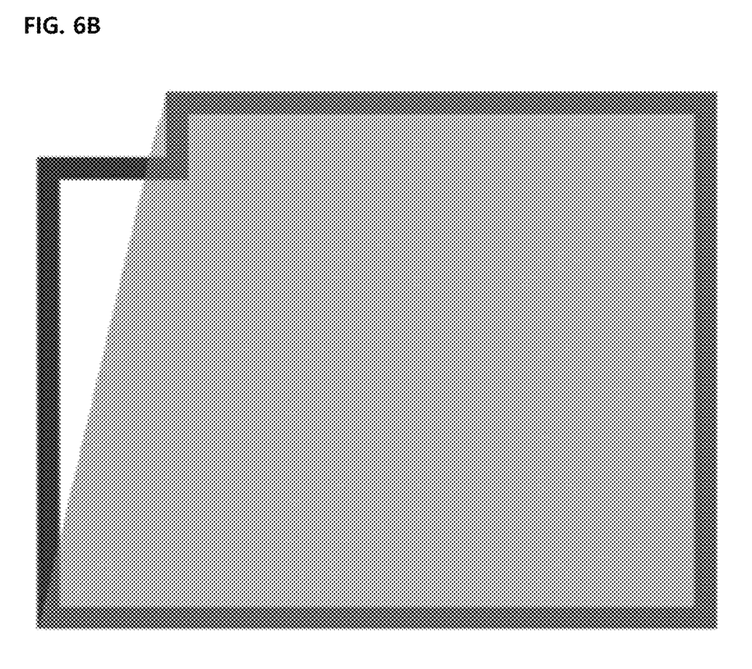

FIGS. 5 to 6B are diagrams illustrating a process of selecting edges for defining a virtual space when a real space is set to a quadrangle having four edges.

Referring to FIGS. 5 to 6B, in a step of determining an x-axis and a z-axis, an algorithm searches four edges in four quadrants, respectively, to obtain a maximum value, and determines the maximum value as a boundary of the virtual space.

The initial value of the edge of each quadrant is set as an origin point, and there is no difficulty in determining the positions of the first, third, and fourth quadrants except for the second quadrant at the upper left side in a rectangular shape.

Considering that one mesh data among the entire mesh data obtained by searching the space has a triangular shape connecting three Vector3 coordinates, if both x and z coordinates of the searched Vector3 are larger than the previously searched edge values, the x and z coordinates are set to the maximum value of space and updated first.

If either one of the x and z coordinates is not large, or neither is large, the edges are determined by comparing the vector values.

The vertices of vectors (1) and (2) of FIGS. 5 to 6B are cases in which both the x-coordinate and the z-coordinate may not fit a large condition during the searching of the second quadrant, but may be classified as the edges of the space.

If the virtual space is created with the edges of the vector (1), a virtual space with a rectangular shape as illustrated in FIG. 6A is created, and if the virtual space is created with the edges of the vector (2), a virtual space with an area as illustrated in FIG. 6B is created.

In order to create a virtual space having the most suitable area in the creation of a rectangular virtual space set by the user, larger vector values need to be created as illustrated in FIG. 6A.

Figure 7:
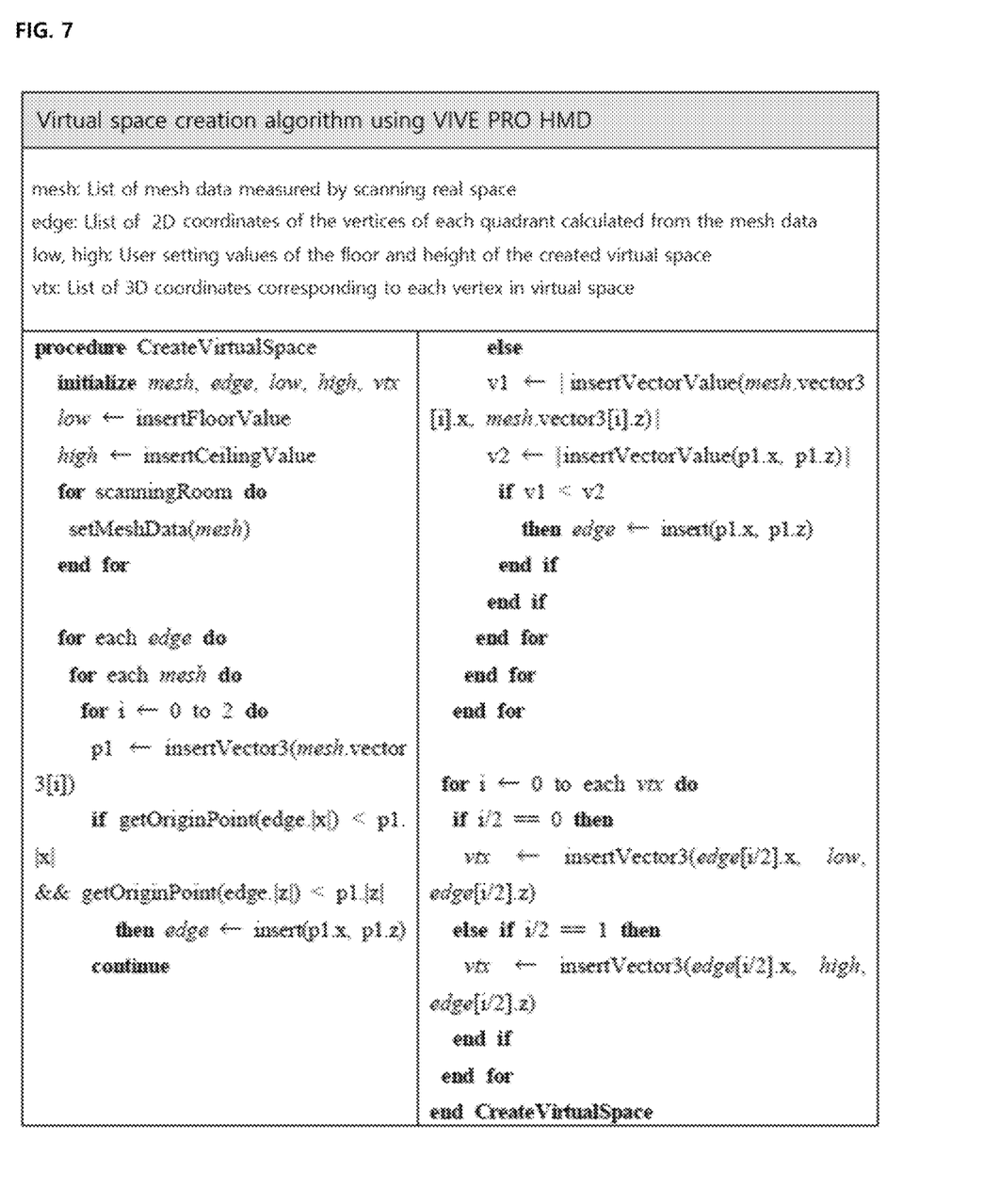
FIG. 7 illustrates a pseudocode for determining a virtual space according to the embodiment.

FIG. 7 illustrates a pseudocode for the process.

In other words, as illustrated in FIGS. 5 to 6B, when there are more first edges of the real space than the edges of a polygon preset for the real space, the virtual world creation apparatus 100 according to the embodiment selects one of a plurality of second edges based on an area of a virtual space defined by each of the plurality of second edges (vector (1), vector (2)) facing a predetermined direction.

In the case of a quadrangle, four edges are located on the first to fourth quadrants, respectively.

As described above, since y among x, y, and z coordinates is fixed, the quadrant may be defined by x and z axes.

As illustrated in FIG. 5, when two edges exist in the second quadrant, one of the two edges needs to be selected.

As described above, the virtual world creation apparatus 100 calculates the area of a virtual space defined by the edge of the vector (1) and the edge of the vector (2), and selects an edge of the vector (1) having a larger size of the area to create a quadrangular virtual space.

Figure 8A:
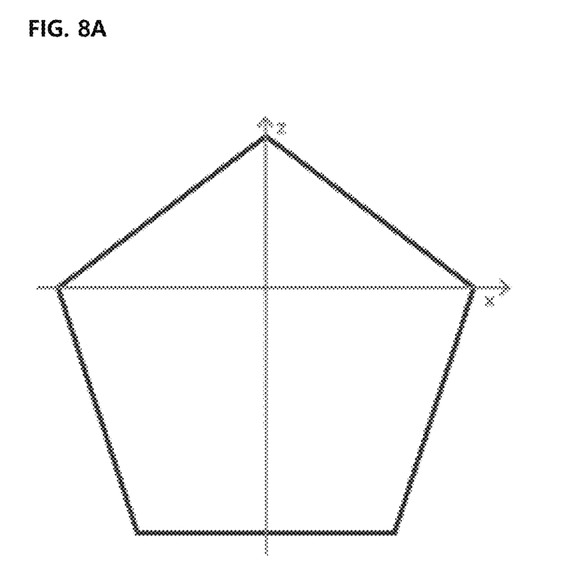
FIGS. 8A and 8B illustrate pentagonal and hexagonal shapes and quadrant division including coordinate axes.
Figure 8B:
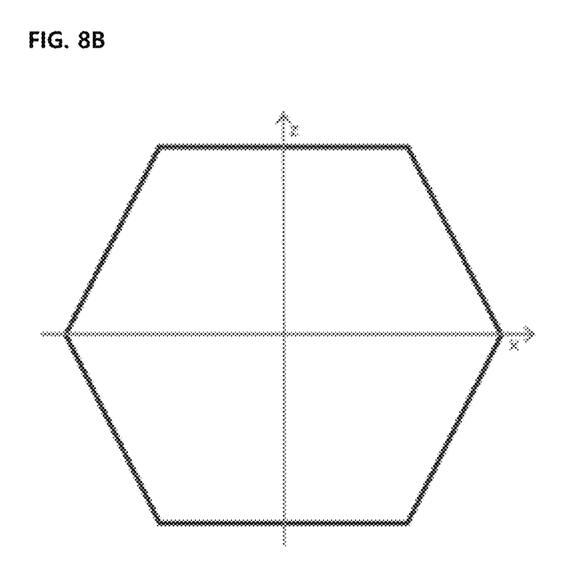

FIGS. 8A and 8B illustrate pentagonal and hexagonal shapes and quadrant division including coordinate axes.

Referring to FIGS. 8A to 8B, in pentagonal and hexagonal shapes, since the edges are disposed not only in quadrants, but also in axial directions, the virtual world creation apparatus 100 calculates the area of a virtual space defined by each of a plurality of edges located within a predetermined angular range on the same axis or the same quadrant, and selects one edge having the largest calculated area to create a virtual space.

Referring back to FIG. 2, when mesh data collection is completed, the 3D reconstruction module 216 reconstructs a 3D image by performing operations, such as mesh data and color, texture, physical collision, and plane detection. In this case, the 3D image may be stored as an OBJ extension file.

In addition, according to the embodiment, the AI vision module 218 performs learning for a real object (e.g., desk, chair, etc.) disposed in the real space by using the 3D image reconstructed in the 3D reconstruction module 216.

As described above, a default tag is assigned to the reconstructed 3D image.

According to the embodiment, a detailed classification process for an object may be performed based on deep learning, and a tag may be changed through this.

For detailed classification of the object, the virtual world creation apparatus 100 according to the embodiment includes a virtual object creation module 240.

The virtual object creation module 240 creates a virtual object by recognizing a specific real object using a deep learning technique based on mesh data.

In the case of object recognition provided by SRWorks of VIVE PRO, a specific real object is recognized through data exchange of the 3D reconstruction module 216 and the AI vision module 218, and the mesh data for each real object is separately provided.

For example, when two different chairs with and without a backrest are scanned using VIVE PRO SRWorks, one mesh data clump is collected from the two chairs scanned at once. When the mesh data is analyzed by the function of SRWorks described above, the mesh data of the chairs, which was a clump, is divided into mesh data of each chair, and at the same time, a tag called 'Chair' is separately input. In this case, the existing mesh data clump is not destroyed, but two mesh data of the tagged chair are duplicated and newly created.

Figure 9A:
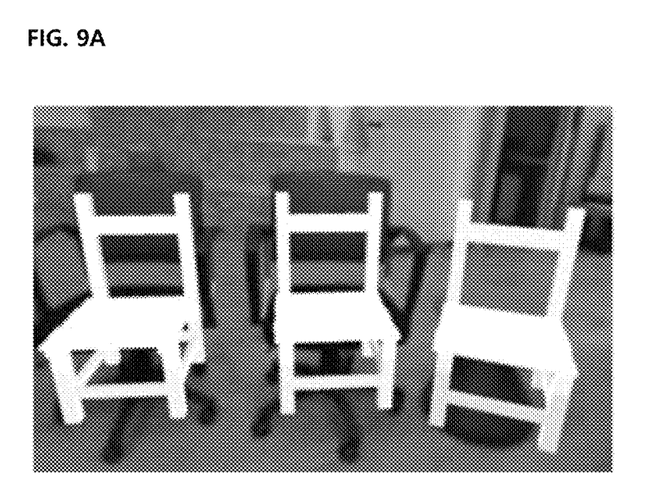
FIGS. 9A and 9B are diagrams illustrating a process for creating a virtual object according to the embodiment.

The mesh data may classify other real objects, but cannot classify the same type of real objects (e.g., a chair with a backrest and a chair without a back) as illustrated in FIG. 9A.

Figure 9B:
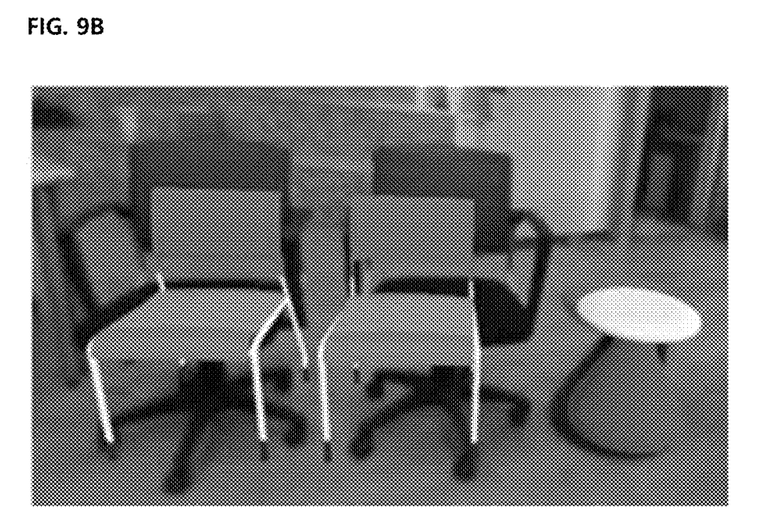

Accordingly, in the embodiment, a default tag is changed to a detailed classified tag through an image classification operation using deep learning on the recognized real object as illustrated in FIG. 9B.

That is, the virtual object creation module 240 according to the embodiment classifies the object recognized in the real space in detail through a deep learning model, and outputs an augmented image of the classified object in detail.

As described above, when the virtual space and the virtual object are created, various types of trainings and disaster situations that cannot be performed in reality may be created.

Figure 10:
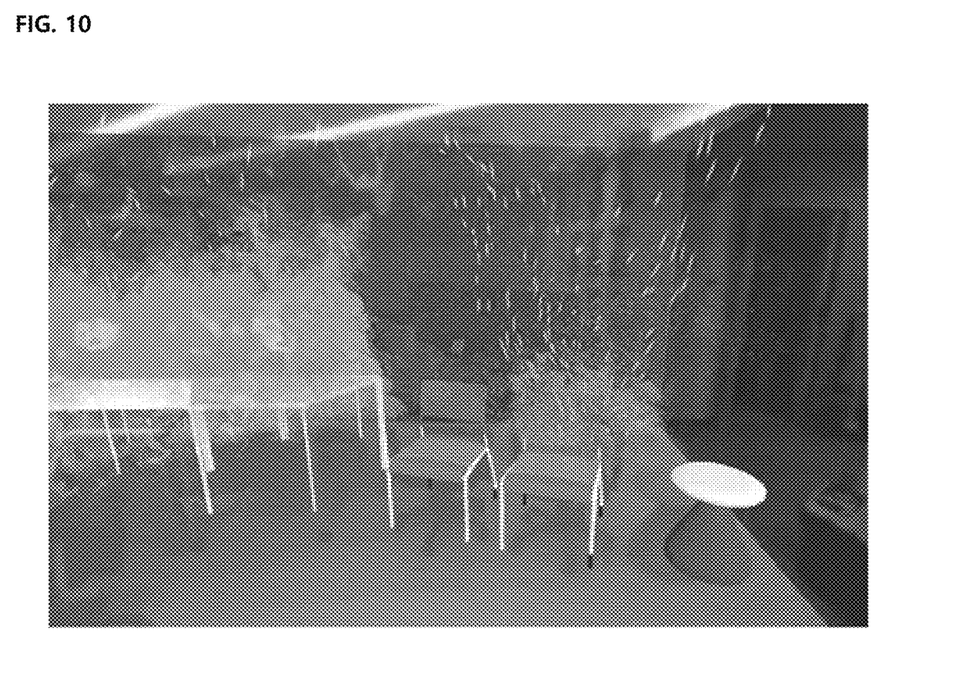
FIG. 10 schematically illustrates a fire situation in a virtual space according to the embodiment.

FIG. 10 schematically illustrates a fire situation in a virtual space according to the embodiment.

Referring to FIG. 10, by expressing an image corresponding to a virtual simulation such as a fire situation in a virtual space, training for finding the position of a fire extinguisher or an emergency exit may be performed virtually.

The embodiments of the present disclosure described above are disclosed for purposes of illustration, and it will be apparent to those skilled in the art that various modifications, additions, and substitutions are possible within the spirit and scope of the present disclosure and these modifications, changes, and additions should be considered as falling within the scope of the following claims.

What is claimed is:

1. An apparatus for creating a virtual world, comprising:
a processor; and
a memory connected to the processor,
wherein the memory stores program instructions executed by the processor to receive an image of a real space through a device having a stereo camera,
collect mesh data for the real space and an object existing in the real space through the image,
determine coordinates for first edges of the real space from the mesh data for the real space,
select one of a plurality of second edges based on an area of a virtual space defined by each of the plurality of second edges facing a predetermined direction, when there are more first edges of the real space than edges of a polygon preset for the real space, and
output a virtual space defined by some of the first edges and the selected one second edge and a virtual object corresponding to the object existing in the real space,
wherein the apparatus is a head-mounted display, and
the program instructions determine coordinates for the first edges by tracking a position of the head-mounted display in the real space through at least two tracking devices disposed in the real space,
wherein in the program instructions, 3D initial coordinates of the head-mounted display are set as an origin point at the center in the real space, and a y-coordinate in the 3D initial coordinates is preset by a user,
wherein a boundary of the real space is defined by x and z coordinates of at least some of the first edges of the real space based on the 3D initial coordinates,
wherein each edge of the preset polygon is disposed in one of quadrants divided into x-axis and y-axis, and the x-axis and z-axis, and
the program instructions calculate an area of a virtual space defined by each of the plurality of second edges positioned within a predetermined angular range on the same axis or the same quadrant, and select one second edge having the largest calculated area.

2. The apparatus for creating the virtual world of claim 1, wherein the program instructions classify the object existing in the real space in detail through a deep learning model, and output a virtual object corresponding to the classified object in detail.

3. The apparatus for creating the virtual world of claim 1, wherein the program instructions output an image corresponding to a virtual simulation preset in the virtual space.

4. A method for creating a virtual world in a computing device including a processor and a memory, comprising:
receiving an image of a real space through a device having a stereo camera;
collecting mesh data for the real space and an object existing in the real space through the image;
determining coordinates for first edges of the real space from the mesh data for the real space by tracking a position of the device having the stereo camera in the real space through at least two tracking devices disposed in the real space;
selecting one of a plurality of second edges based on an area of a virtual space defined by each of the plurality of second edges facing a predetermined direction, when there are more first edges of the real space than edges of a polygon preset for the real space; and
outputting a virtual space defined by some of the first edges and the selected one second edge and a virtual object corresponding to the object existing in the real space,
wherein 3D initial coordinates of the device having the stereo camera are set as an origin point at the center in the real space, and a y-coordinate in the 3D initial coordinates is preset by a user, and
the selecting step includes defining a boundary of the real space by x and z coordinates of at least some of the first edges of the real space based on the 3D initial coordinates,
wherein each edge of the preset polygon is disposed in one of quadrants divided into x-axis and y-axis, and the x-axis and z-axis,
the selecting step includes calculating an area of a virtual space defined by each of the plurality of second edges positioned within a predetermined angular range on the same axis or the same quadrant, and selecting one second edge having the largest calculated area.

5. A program stored in a non-transitory computer-readable recording medium for performing the method according to claim 4.

\* \* \* \* \*